United States Patent

[11] 3,582,635

| [72] | Inventor | Leo Slobodin |
| | | Holmdel, N.J. |
| [21] | Appl. No. | 721,660 |
| [22] | Filed | Apr. 16, 1968 |
| [45] | Patented | June 1, 1971 |
| [73] | Assignee | Lockheed Aircraft Corporation |
| | | Burbank, Calif. |

[54] OPTICAL CORRELATION OF ELECTRONIC PULSES
18 Claims, 6 Drawing Figs.

[52] U.S. Cl. .................................................. 235/181, 250/216, 343/7R, 350/162ZP
[51] Int. Cl. ...................................................... G06g 7/18, H03k 19/14
[50] Field of Search ......................................... 235/181; 250/216; 343/112, 7, 17; 350/161, 162

[56] References Cited
UNITED STATES PATENTS

| 3,482,107 | 12/1969 | Hock | 350/162X |
| 3,483,386 | 12/1969 | Jernigan | 350/161X |
| 3,493,287 | 2/1970 | Lohmann | 350/162 |
| 3,349,231 | 10/1967 | Harmon | 235/181 |
| 3,355,579 | 11/1967 | Robertson | 235/181 |
| 3,432,647 | 3/1969 | Wilmotte | 235/181 |
| 3,441,724 | 4/1969 | Taylor | 235/181 |

*Primary Examiner*—Malcolm A. Morrison
*Assistant Examiner*—Felix D. Gruber
*Attorneys*—Billy G. Corber and George C. Sullivan ABSTRACT: A moving waveform density image induced in an ultrasonic light modulator by an applied electronic pulse is optically correlated with a diffraction grating formed by grooves in a transparent plate inserted in the modulator. A collimated light beam passing through the modulator transversely of both the moving waveform density image and grooved plate is optically diffracted and the diffracted light is focused by a lens upon a slit preceding a photodetector in such a manner that only a lower order of the diffracted light passes through the slit. The photodetector responds to changes in light intensity resulting from phase correlation of the density image and the grooves in the plate to provide an electrical output signal representing the correlation function. Pulses of carrier wave energy which are narrow relative to the full optical aperture of the correlator are expanded and pulses which are long relative to the full optical aperture are compressed by the device.

INVENTOR.
LEO SLOBODIN

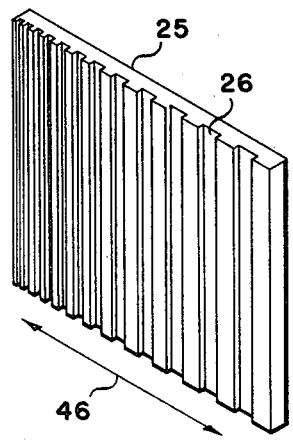
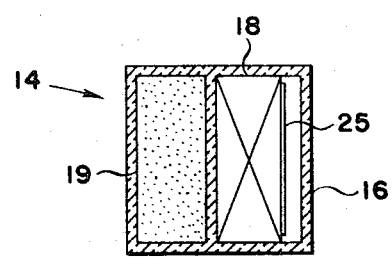
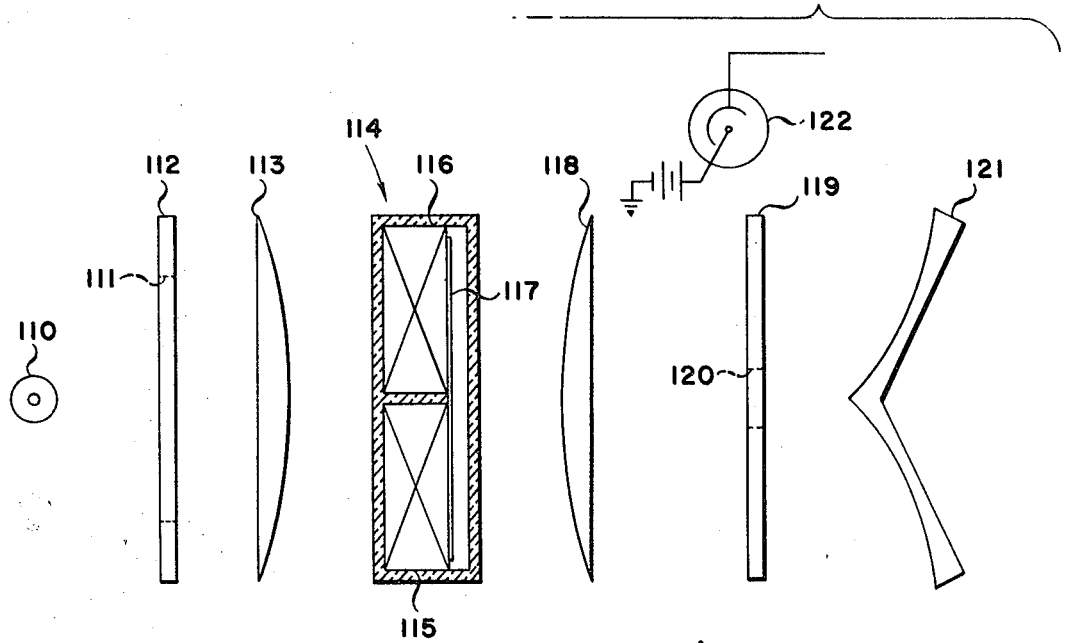

OPTICAL CORRELATION OF ELECTRONIC PULSES

BACKGROUND OF THE INVENTION

This invention relates generally to optical correlators for processing electronic pulses and more particularly to an improved optical correlator having a grooved transparent plate immersed in the waveform propagating medium of an ultrasonic light modulator to establish alternate phase variations for comparison with alternate phase variations induced by ultrasonic waves set up in the medium by applied electronic pulses. A collimated light beam directed through the modulator is diffracted by these phase variations to provide corresponding periodic variations in the intensity of the diffracted light.

The term "electronic pulse" as used herein means a pulse produces by a burst of carrier wave energy which may or may not be of constant amplitude and contain cycles of varying frequency.

In U.S. Pat. No. 3,189,746 there is described an optical correlator employing an ultrasonic light modulator with a density-type correlator mask displaying a series of parallel opaque strips separated by light transmissive slits. The opaque strips and light transmissive slits form a diffraction grating for optically correlating the moving waveforms produced in the ultrasonic light modulator by applied electronic pulses. Such density-type correlator mask systems perform well where noise levels are favorable. However, in many uses for optical correlators such as in the field of communications, higher signal to noise ratios than are normally obtainable with density-type masks are desirable.

SUMMARY OF THE INVENTION

The teachings of this invention are directed toward improving on the system described in the above-identified patent, particularly as regards simplifying the optics and providing superior signal to noise performance.

It is a primary object of this invention to provide an improved optical correlator for processing electronic pulses on an instantaneous (real time) basis. Light loss and system noise are minimized by simplified optics wherein a grooved transparent plate, sometimes hereinafter referred to as a phase replica or replica plate, is inserted directly in the ultrasonic light modulator to perform the correlation function. The grooved plate is selected from a material having a different refractive index than that of the surrounding medium in the modulator. Therefore, the wave front of the collimated light beam passing through the modulator becomes corrugated by virtue of the alternate phase retardations imposed on the light beam by the grooves and spaces on the plate. When an ultrasonic waveform is generated in the waveform propagating medium of the modulator, the compressions and rarefactions of the ultrasonic waves cause alternate variations in the quiescent refractive index of the medium which diffract the light beam in much the same manner as the phase replica. The compressional portion of each of the waves causes phase retardation (increased refractive index) of the light beam while rarefaction (decreased refractive index) causes phase advancement, both relative to the quiescent phase position of the light wave front. As the ultrasonic waves propagate past the replica plate at some instant the compressions and rarefactions mate out of phase with the grooves and spaces, respectively, of the replica plate, canceling or attenuating the overall diffraction, i.e., the phase retardation of the wave compressions compensates for the relative phase advancement provided by the replica grooves and, similarly, though in the reverse sense, the wave rarefactions compensate for the phase retardation of the replica spaces. The ultrasonic waves are thus out of phase with the replica. Advancement of the ultrasonic energy by a half wavelength at some instant later causes the ultrasonic waves to be in phase with the replica and the diffraction is thereby enhanced. Movement of the ultrasonic waves past the replica plate therefore produces periodic variations in the intensity of the diffracted light and these are sensed by a photodetector. The output of the photodetector, an electronic signal proportional to the diffracted light intensity at any instant, maps the correlation of the ultrasonic waves with the stored signal history on the replica plate.

In the device of this invention the correlation function is performed in the ultrasonic light modulator directly between the ultrasonic wave and replica and without an interposed optics system. Thus, problems such as lens field curvature and image size variations due to inexact positioning of lenses are eliminated from the correlation process.

Also significant in the device of this invention is the reduction in light loss and system noise obtainable with the use of fewer lenses. System noise from lens imperfections, scratches and dust is minimized.

A further object of this invention is to provide additional improvement in obtainable signal to noise ratios through use of dual mode correlation detection wherein only that portion of the full optical aperture through the modulator subtended by the ultrasonic wave is viewed by the detector during the pulse expansion process. Thus, system noise contained in the remainder of the full optical aperture is excluded from detection.

Other objects and advantages will become apparent from a reading of the following detail description, especially when considered together with the accompanying drawings wherein like numerals refer to like parts.

BRIEF DESCRIPTION OF THE DRAWING

FIG. 2 is an isometric view showing the construction of the phase replica plate for the FIG. 1 device wherein the plate thickness and groove depth and spacing are exaggerated for clarity;

FIG. 3 is a sectional view taken approximately on line 3-3 of FIG. 1 through the ultrasonic light modulator;

FIG. 6 schematically illustrates a modified embodiment of the invention apparatus.

DESCRIPTION OF THE PREFERRED EMBODIMENTS

Figure 1:
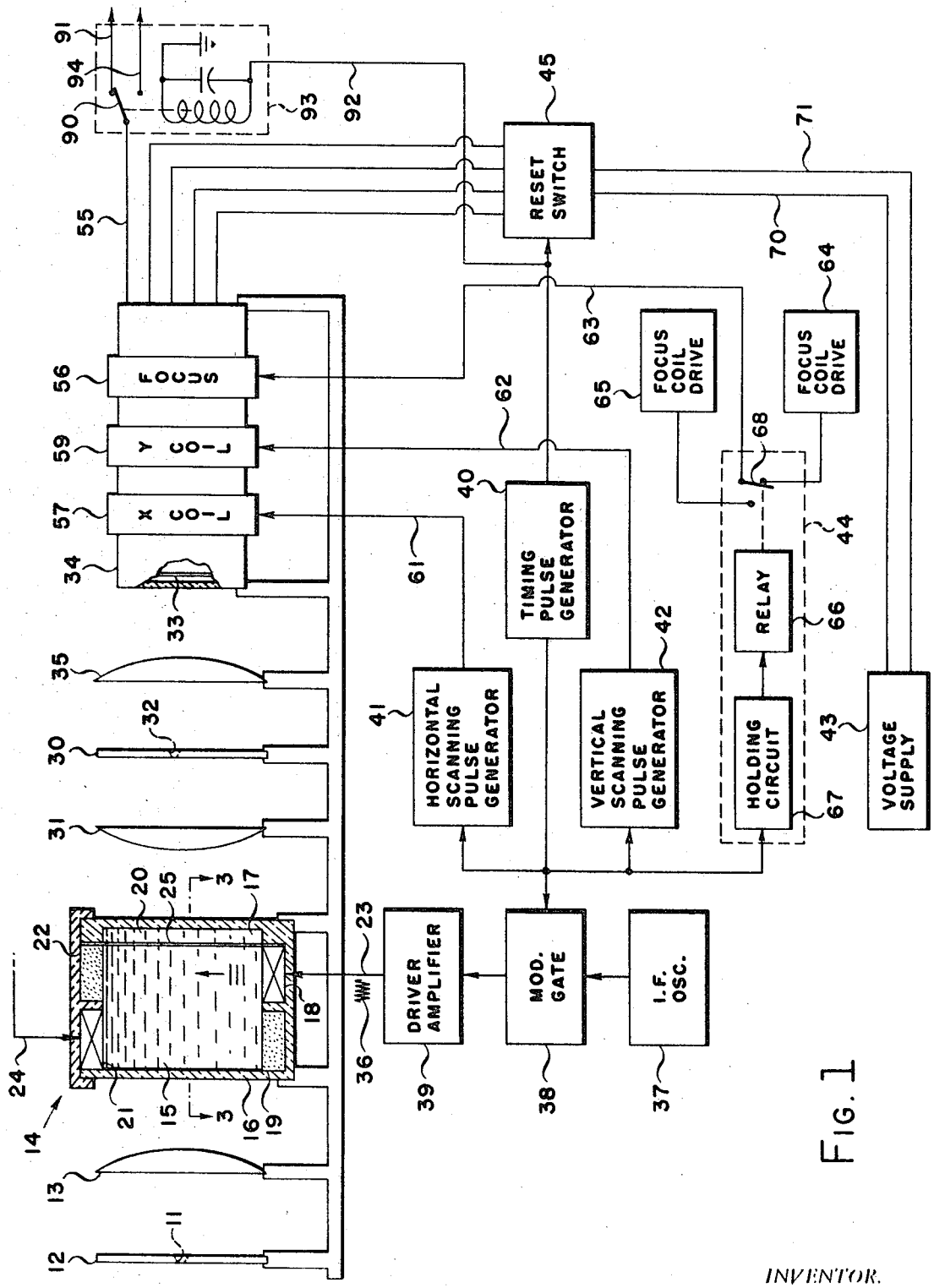
FIG. 1 schematically illustrates a representative preferred embodiment of the invention apparatus.

In the apparatus of FIG. 1, a point or slit source of light such as that derived from a mercury arc lamp 10 feeding through slit 11 in diaphragm 12 is collimated by lens 13 to illuminate an ultrasonic light modulator 14.

Ultrasonic light modulator 14 includes a light transmissive column of material 15, a solid such as quartz or a fluid such as water, covering substantially the entire optical aperture. The column of fluid is enclosed within a tank or storage cell 16, the sides of which normal to the light beam are transparent or light transmissive. At one end 17 of the column is a piezoelectric transducer 18 and a sonic wave energy absorber 19 juxtaposed in the direction of the light beam as shown in FIGS. 1 and 3. At the opposite end 20 of the column is a second piezoelectric transducer 21 and sonic wave energy absorber 22 also juxtaposed in the direction of the light beam but with reverse relative positions so that ultrasonic waves generated at one end of the fluid column are absorbed at the opposite end by an energy absorber 19 or 22.

While the column of material 15 serving as the ultrasonic wave propagating medium may, as indicated above, be a solid such as quartz, it is preferably a fluid and will be so identified in this description for convenience. It should be understood, however, as being within the teachings of this invention to substitute for the fluid a solid such as quartz.

When transducer 18 or 21 in ultrasonic light modulator 14 is excited by an electronic pulse applied through lead 23 or 24, respectively, compressional waves are set up in the fluid. These compressional waves travel through the fluid and cause local periodic changes in the index of refraction of the fluid. When collimated light passes through the disturbed fluid, diffraction of the light results.

A grooved replica plate 25 of glass or other equivalent light transmissive material is inserted in the ultrasonic light modulator by immersion in fluid medium 15 adjacent transducer 18 on the side away from the light source; that is, the light passes through the ultrasonic waves before impinging on replica plate 25. The location of the replica plate with respect to the ultrasonic waves traveling in the medium is preferably at the edge of the wavefront; however, it may be placed in the center of the ultrasonic beam (when the ultrasonic beam is sufficiently wide relative to the replica thickness that the replica does not occult more than a small portion of the ultrasonic beam) or at the first or higher light coincidence nodes just past the ultrasonic beam in the direction of the light beam path. The light emerging from the ultrasonic beam is bent from its original direction in varying amounts, depending on the location of the various light rays with respect to the ultrasonic compressional wave positions at any given instant of time. Therefore, at certain positions in space just beyond the ultrasonic beam, the bent rays will cross and form a secondary signal density image still in the waveform propagating medium. It is at that crossing, or higher order ray crossing position, that the replica plate is located relative to transducer 21 while being contiguous with the ultrasonic beam generated by transducer 18 in the FIG. 1 configuration.

Phase replica plate 25, when made of glass and used in a water medium, is preferably on the order of 0.01 inch or less in thickness with a series of spaced grooves 26 formed in one side of the plate to a depth in the order of a micron. Conventional photo etching techniques are well suited to forming the required groove pattern on the plate, however, it should be understood that this invention is not to be limited to any particular process or method by which the plate is made. It is also to be noted that the thickness of the grooved plate is of secondary importance. It is the depth of the grooves and the difference in refractive index between the plate material and the ultrasonic wave propagating medium (water, for example) which determines the extent of light diffraction. With glass as the plate material and water as the propagating medium in the ultrasonic light modulator, groove depths varying between a few tenths of a micron to about 1 micron from replica to replica have been found to provide good optical system performance.

Grooves 26 in replica plate 25 are oriented to extend in a direction normal to the direction of propagation of the ultrasonic waves in the medium as indicated by arrow 46 in FIG. 2 and are located in the plate on the side away from the ultrasonic waves. Also, as shown in FIG. 2, the width of the grooves may not be constant but may vary in a predetermined manner across the replica plate to provide a groove width and spacing corresponding to the desired output waveform. The width of the grooves and spaces defines the signal wavelengths and the extent of groove periodicity variation defines the signal bandwidth and thus a stored signal history is contained on the replica plate in the optical aperture of the correlator representing the desired output waveform.

The amplitude and frequency of the bursts of carrier wave energy which make up the electronic pulses applied to the ultrasonic light modulator 14 need not correspond even approximately to the waveform pattern formed in replica plate 25. All that is necessary is that the electronic pulses contain a frequency spectrum which encompasses all the frequencies of the desired output waveform on the replica plate. As the ultrasonic waveforms traveling in the waveform propagating medium correlate with the grooves and spaces on replica plate 25, the light beam directed through the modulator is diffracted to thereby perform the correlation process. The diffracted light intensity at any instant represents the correlation product of the ultrasonic waves and the waveform pattern on the replica plate. Detection of this correlation product is achieved by focusing the light emerging from the modulator onto stop 30 through lens 31. Stop 30 is provided with a slit 32 optimumly positioned in such manner as to pass only the first or second order of diffracted light. The zero order and preferably also the higher diffracted orders are attenuated at the stop. The diffracted light passing slit 32 is projected onto the translucent photocathode 33 of image dissector 34 as a photo image of the correlation function and converted to a corresponding electrical signal forming the output of the correlator. If necessary in order for the image dissector to view the full optical aperture of the system, the proper field size of the image at the window of the dissector can be obtained by use of a suitable condensing lens system such as represented by lens 35.

As explained in U.S. Pat. No. 3,189,746 identified above, optical correlators of the general type here involved are capable of expanding electronic pulses which are short relative to the optical aperture in the system and of compressing pulses which are long relative to the optical aperture. The correlator device, as applied to processing of electronic pulses for communications purposes normally operates in both pulse expansion and pulse compression modes. In the expansion mode, the pulse to be transmitted is formed by scanning, with a carrier pulse narrow with respect to the full optical aperture of the correlator, a replica plate containing the signal history. The ratio of the width of the narrow carrier pulse to the width of the replica plate in the full optical aperture is equal to the pulse expansion ratio. For a given length of replica (i.e., optical aperture), the narrow carrier pulse width must decrease in direct proportion to the increase in the expansion ratio. This decreased width produces a proportional decrease in signal to noise ratio for a constant scanning pulse amplitude, since there is less signal to compete with the noise in the optical aperture.

In the compression mode, the expanded signal is correlated with the signal history on the replica plate, resulting in what is essentially a reconstruction of the narrow carrier pulse. During this mode, the photodetector is required to view the entire aperture for performing the correlation function. However, during the expansion mode, it is necessary to view only the area occupied by the narrow carrier pulse appearing in the ultrasonic light modulator as an ultrasonic wave which may be only a small percentage of the total optical aperture. By limiting the viewing field of the photodetector during the pulse expansion mode so as to observe only the area occupied by the narrow scanning pulse in the modulator, an increase in the signal to noise ratio approximating that of the expansion ratio may be obtained. It is the function of the image dissector 34 and related control circuitry shown in FIGS. 1 and 4 to provide the increase in signal to noise ratios obtainable through narrowing the field of view of the photodetector during the expansion mode.

As shown in FIG. 1, transducer 18 in the ultrasonic light modulator is subjected to applied electronic pulses 36 representing the narrow carrier pulse referred to above. The narrow carrier pulse is generated by an intermediate frequency oscillator 37 operating through a gate modulator 38 and driver amplifier 39. Gate modulator 38 is controlled by the output from a timing pulse generator 40 to control the pulse width and repetition rate of the carrier pulses applied to the transducer.

The output of timing pulse generator 40 is also applied to horizontal scanning pulse generator 41, vertical scanning pulse generator 42, reset switch 44 and reset switch 45 to synchronize the operation of image dissector 34 with the generation of ultrasonic waves in the light modulator.

Figure 4:
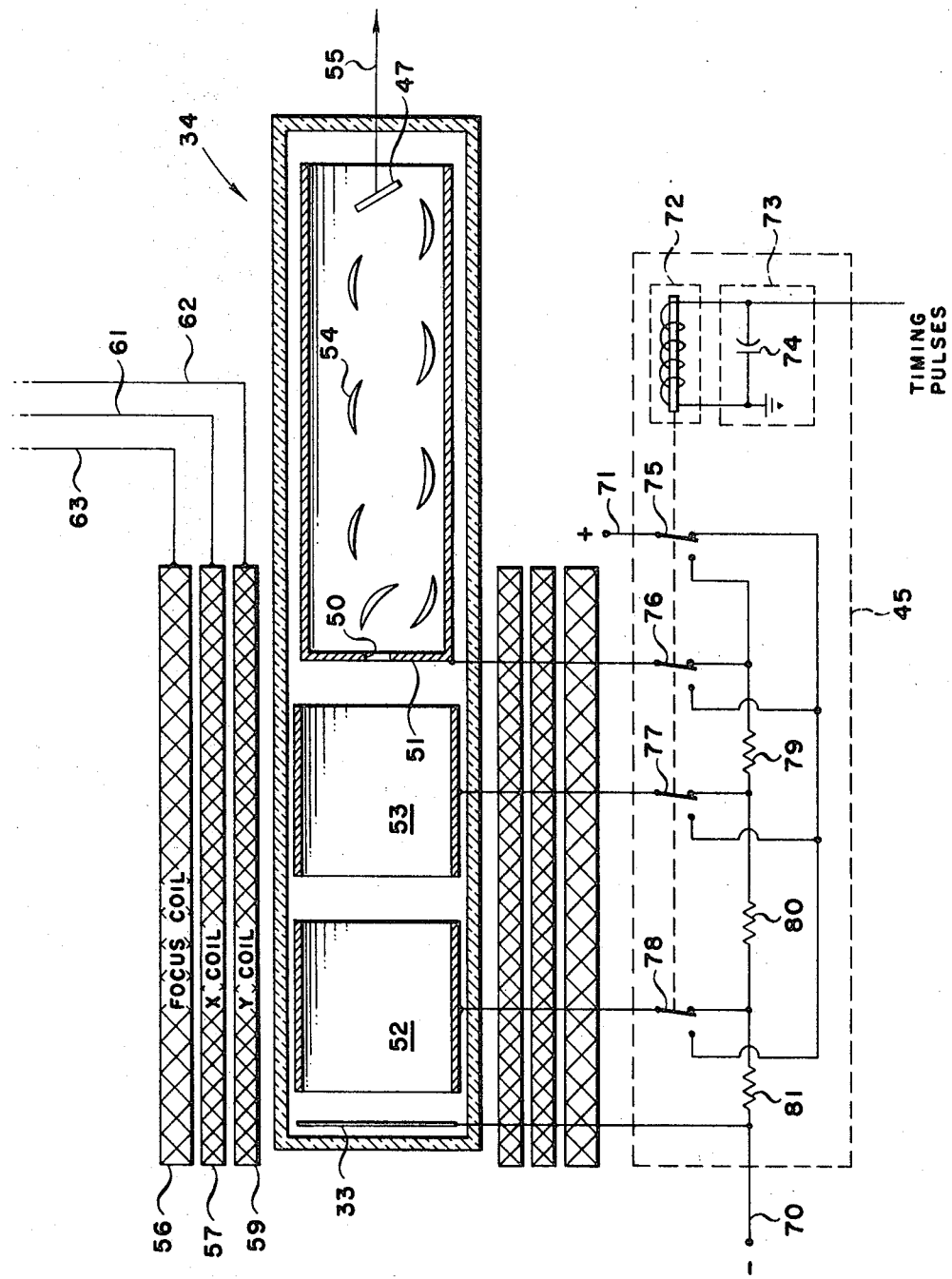
FIG. 4 is a schematic sectional view of a dual mode image dissector and switching arrangement suitable for the FIG. 1 device.

The construction of image dissector 34 is best shown in FIG. 4 wherein the optical image focused on photocathode 33 generates a photoelectric emission pattern representing the optical image. This electro-optical image derived from the photocathode is brought to focus at the image plane of aperture 50 in anode 51. The size of the electro-optical image appearing at aperture 50 is determined by the electrical potential gradient applied to accelerating rings 52 and 53 from voltage supply 43. Behind aperture 50 is a series of electron multiplier stages 54 having a collector 47 and an output 55. Surrounding the dissector between photocathode 33 and anode 51 is a focus coil 56, a horizontal deflecting coil 57 (designated X-coil in the drawing) and a vertical deflecting coil 59 (designated Y-coil in the drawing). Deflection coils 57 and 59 serve to sweep the image over the aperture in the conventional manner such that, at any instant only the electrons entering the electron multiplier through the aperture are utilized. Focus coil 56 focuses the electro-optical image at the image plane of aperture 50.

Ramp voltages from horizontal and vertical scanning pulse generators 41 and 42 are applied to the X and Y coils 57 and 59 of the image dissector through leads 61 and 62, respectively. Focus coil 56 is coupled through lead 63 to either focus coil drive unit 64 or 65 of relay 66, forming part of reset switch 44. Relay switch 68 is shown in the relay deenergized position. When a pulse from timing pulse generator 40 is applied to holding circuit 67 of reset switch 44, the relay is energized and held energized for a predetermined length of time at least equal to that required for a narrow carrier pulse ultrasonic wave to travel through the modulator 14 from one end of the fluid column to the other. Thus, focus coil drive unit 65 is coupled to focus coil 56 on the image dissector during this pulse expansion processing period and when the relay deenergizes for the pulse compression processing period, the voltage is supplied by focus coil drive unit 64.

The operating voltage applied between photocathode 33 and anode 51 is supplied from voltage supply 43 through leads 70 and 71 coupled to reset switch 45. Reset switch 45 includes a relay 72 which is coupled to the output of timing pulse generator 40 through a holding circuit 73 as shown in FIG. 4. The holding circuit here and in holding relay 44 may consist essentially of a capacitor 74 which is coupled in parallel with the relay coil to receive a charge from the timing pulse which will hold the relay energized for the desired period of time by discharging, following the application of the timing pulse. In the relay deenergized condition, contacts 75, 76, 77 and 78 of relay 72 are in the position shown in FIG. 4 wherein the aperture plate accelerating potential applied through lead 71 is serially reduced through resistors 79, 80 and 81 and coupled to accelerating rings 52 and 53 and photocathode 33 to constrain the electro-optical image size at aperture 50 to cause electrons from the entire photocathode surface upon which the full optical image field is focused to be directed through the aperture to the dynodes 54 of the electron multiplier.

When a timing pulse is applied to energize relay 72, switching contacts 75, 76, 77 and 78 couple the anode supply voltage through lead 71 directly to anode 51 and accelerating rings 52 and 53, bypassing voltage dropping resistors 79, 80 and 81. In this, the pulse expansion mode of the correlator, the horizontal and vertical scanning coils are energized by ramp voltages supplied by pulse generators 41 and 42 while the focus coil voltage is supplied by drive unit 65. During this operating mode of the image dissector, it is operated in classic fashion to sweep the image over the aperture so that only a narrow portion of the entire optical aperture which is occupied by the ultrasonic wave in the light modulator 14 enters the electron multiplier through aperture 50. During this expansion mode, the dissector is synchronized to scan at the same rate and direction that the narrow ultrasonic wave propagates in the delay medium of the modulator. Thus, the narrow carrier pulse is constantly maintained in the aperture of the image dissector while the rest of the electro-optical image field is excluded. A single scan is required for each expanded pulse. During the relatively long time interval between expanded pulses the operation of the image dissector is changed to accommodate the compression mode. Since compression mode correlation requires that the entire aperture be viewed, the dissector scan is stopped on termination of the ramp voltage supplied by generators 41 and 42 while the voltage supply to focus coil 56 switches from drive unit 65 to drive unit 64. In this connection, holding circuit 67 is designed to hold the relay 66 energized until the ramp voltages to the scanning coils are terminated. Similarly, relay 72 in reset switch 45 is caused to deenergize at this time and reset the voltage supplied to the accelerating rings 52 and 53 of the image dissector. Thus, during the compression mode the full image field is focused through aperture 50 of the image dissector for detection and amplification.

The output of image dissector 34 in the pulse compression mode of operation is through relay contact 90 to lead 91. At the start of each pulse expansion mode, the output pulse from timing pulse generator 40 is applied through lead 92 to holding relay 93 causing contact 90 to switch the output of the image dissector from lead 91 to lead 94. Holding relay 93 maintains the coupling of lead 94 to the output of the image dissector until the expansion mode is completed, at which time the relay deenergizes and switches back to the lead 91 output connection.

Figure 5:
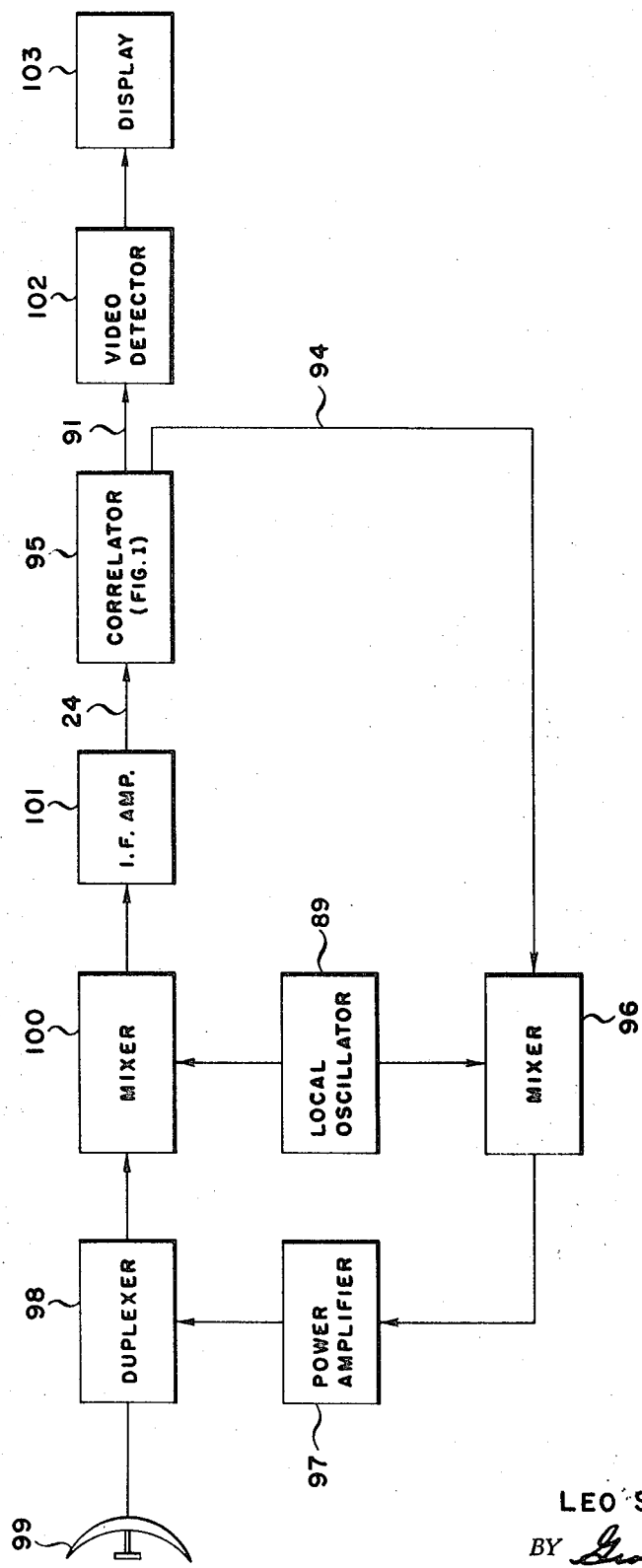
FIG. 5 is a schematic block diagram illustrating a typical application of the invention device to a radar communications system.

Referring now to FIG. 5, the correlator of FIG. 1 is shown as block 95 in a block diagram schematic of a radar communications system. In such applications of the correlator, the expanded pulse output appearing at lead 94 is heterodyned with the output from a local oscillator 89 in mixer 96. The expanded radio frequency pulses obtained at the output of mixer 96 are amplified to the desired transmitting power level by power amplifier 97 and fed through duplexer 98 to a radiating antenna 99.

The radiated pulse energy reflected back to the antenna is fed through duplexer 98 to a second mixer 100 where it is converted by heterodyning with the output from local oscillator 89 to substantially the original intermediate frequency expanded pulse output previously produced by correlator 95 at lead 94. The received expanded pulses are then applied to an intermediate frequency amplifier 101 and applied through lead 24 to the input of the correlator for the compression mode processing. The received expanded pulse is a wide pulse, nearly as wide as the optical aperture, and is applied to transducer 21 in the FIG. 1 light modulator. This pulse must contain certain qualifications to allow the compression process to take place. The pulse must contain the same frequency modulation characteristic as that of the grooves on the replica plate 25, and hence it is essentially equivalent to the expanded output pulse previously described. In addition, if the pulse waveform is frequency modulated the frequency structure characteristic of the pulse must undergo time inversion. This means that if, for example, the pulse contained a frequency modulation or, equivalently, a frequency delay characteristic such that the lower frequencies occurred near the leading edge of the pulse and the higher frequencies occurred near the trailing edge, the frequency positions (or delay) would have to be reversed so that the higher frequencies were positioned at the leading edge and the lower frequencies were positioned at the trailing edge. This simply means that frequency delay equalization is necessary for pulse compression. That is, the frequencies which were time delayed most during the expansion phase must be time delayed the least for the compression phase; and likewise, those frequencies delayed the least during expansion must now be delayed the most for compression. This delay inversion is achieved in the FIG. 1 correlator simply by propagating the pulse energy during the compression mode through the ultrasonic light modulator in a direction opposite that used for pulse expansion.

In the FIG. 5 radar system, the compressed pulse output of the correlator is directed through lead 91 in a manner as set forth in detail in the description of FIG. 1 and applied to a video detector 102 for presentation by a cathode ray tube or other suitable display device 103 as reflected energy from a remote target.

Numerous variations of the FIG. 1 apparatus are possible within the teachings of this invention. A typical variation is illustrated in FIG. 6 wherein light from a suitable source 110 is directed through a slit 111 of diaphragm 112 and collimated through lens 113 to illuminate an ultrasonic light modulator 114. Transducers 115 and 116 in the light modulator are here arranged side-by-side in the collimated light beam rather than one in front of the other as in the FIG. 1 configuration. Replica plate 117 is positioned in the modulator downstream from the transducers so as to be generally contiguous with the ultrasonic waves traveling in the delay medium. The grooves formed in plate 117 may extend across the entire width of the plate where necessary delay inversion is achieved by positioning transducers 115 and 116 at opposite ends of the delay medium column, however, where the transducers are at the same end of the column, as shown, the necessary delay inversion is conveniently obtained by reversing the groove pattern on that portion of the plate situated behind one of the transducers as compared with the groove pattern on the plate behind the other transducer.

In this FIG. 6 configuration, the collimated light beam is focused through lens 118 onto a stop bar 119 having a slit 120 formed therein to pass only the lower orders of diffracted light as in the FIG. 1 device. A beam splitter 121 directs the diffracted light from one side of modulator 114 to a phototube 122 for compression mode signal processing while the diffracted light from the other side of the modulator is directed to a standard image dissector 123 for expansion mode signal processing. Image dissectors suitable for such applications are commercially available from a number of sources. Image dissector tube Type F 4011, as supplied by the International Telephone and Telegraph Corporation's Industrial Laboratories Division located in Fort Wayne, Ind. would, for example, be suitable for providing the correlator output during the expansion mode.

Configurations of the correlator device, other than those specifically described herein, will be apparent to those skilled in the art from a reading of the foregoing description. Different lens systems and different modulator transducer arrangements can readily be employed, for example, as can photodetectors other than the disclosed image dissectors and it is to be understood that such alterations, modifications and substitutions may be made to the instant disclosure without departing from the teachings of this invention as defined by the spirit and scope of the appended claims.

I claim:

1. An optical correlator for processing electronic pulses comprising, a light transmissive medium for propagating ultrasonic waves, a light source for directing a beam of light through said medium, a light transmissive replica plate immersed in said medium and transversely intersecting said light beam, transducer means responsive to an applied electronic pulse for generating an ultrasonic wave which travels in said medium between said plate and light beam source in a direction generally parallel with said plate and transversely of the light beam, said plate having a refractive index different from that of said medium and a series of grooves formed therein of a width and spacing representing a stored signal history of the desired output waveform, said grooves being arranged generally normal to the direction of travel of said ultrasonic waves, and photodetector means responsive to correlation of the ultrasonic waves, and photodetector means responsive to correlation of the ultrasonic waves with the stored signal history on said plate to provide electrical output signals having a waveform construction representing the correlation function.

2. A device as defined in claim 1 wherein the grooves formed in said plate are on the side away from said light source.

3. A device as defined in claim 2 wherein said plate is of a material having a higher refractive index than said medium.

4. A device as defined in claim 2 wherein said light transmission medium is water and said plate is glass.

5. A device as defined in claim 2 wherein said plate is in a plane substantially contiguous with said ultrasonic wave.

6. A device as defined in claim 1 wherein said light beam illuminates substantially the entire portion of said plate containing the stored signal history of the desired output waveform.

7. A device as defined in claim 1 wherein said light transmissive medium is a fluid.

8. A device as defined in claim 1 wherein said applied electronic pulse is narrow relative to the length of said medium, and said output signal is an expanded replica of said applied electronic pulse.

9. A device as defined in claim 8 including means for applying said output signal to said transducer means whereby a processed signal is obtained at the output of said photodetector means which is a time compressed replica of said output signal corresponding substantially to said applied electronic pulse.

10. A device as defined in claim 1 including a light stop having a slit formed therein between the photodetector means and said medium, and lens means focusing the light beam at the stop so as to pass only diffracted light which contains an optical image of the correlation function.

11. A device as defined in claim 10 wherein said photodetector means includes a dual mode image dissector, and control means for performing mode selection.

12. A device as defined in claim 10 wherein said photodetector means includes an image dissector for scanning said optical image by tracking said ultrasonic waves.

13. A device as defined in claim 10 wherein said photodetector means includes an image dissector having a static mode with a viewing area encompassing the entire optical image and a scanning mode with a restricted viewing area encompassing only the ultrasonic waves, control means for performing mode selection, and synchronizing means causing said image dissector to track said ultrasonic waves.

14. A device as defined in claim 10 wherein said photodetector means includes a beam splitter providing two distinct optical paths, a photosensitive device having a static viewing area encompassing the entire optical image in one of said paths, an image dissector having movable viewing area encompassing at any instant only a portion of the optical image in the other of said paths, and synchronized control means for directing the movement of said viewing area to scan said optical image.

15. An optical correlator for processing electronic pulses comprising, a light transmissive medium for propagating ultrasonic waves, a light source for directing a beam of light through said medium, transducer means responsive to applied electronic pulses for generating ultrasonic waves which travel in said medium in a direction generally normal to said light beam, a stationary replica plate having a diffraction grating representing a stored signal history of the desired output waveform interposed in said light beam, a dual mode image dissector responsive to correlation of the ultrasonic waves with the stored signal history on said plate to provide an electrical output signal having a waveform construction representing the correlation function, and control means coupled to said image dissector for performing mode selection.

16. A device as defined in claim 15 including a light stop having a slit formed therein and located between said image dissector and said replica plate, and lens means focusing the light beam at the stop so as to pass only diffracted light which contains an optical image of the correlation function.

17. A device as defined in claim 16 wherein said dual mode image dissector in one mode has a static viewing area encompassing the entire optical image and in the other mode a movable viewing area encompassing at any instant only a portion of the optical image, and synchronized drive means for directing the movement of said viewing area to scan said optical image.

18. In an optical correlator including an ultrasonic light modulator having a light modulator having a light transmissive medium therein for propagating ultrasonic waves, a light transmissive replica plate immersed in said medium and having a series of grooves formed therein as a diffraction grating containing a stored signal history of a desired output waveform, said plate having a thickness less than one-tenth inch and a nominal groove depth on the order of a micron.